April 13, 1937.  C. H. PERKINS  2,076,916
SAW SHARPENER
Filed March 10, 1936
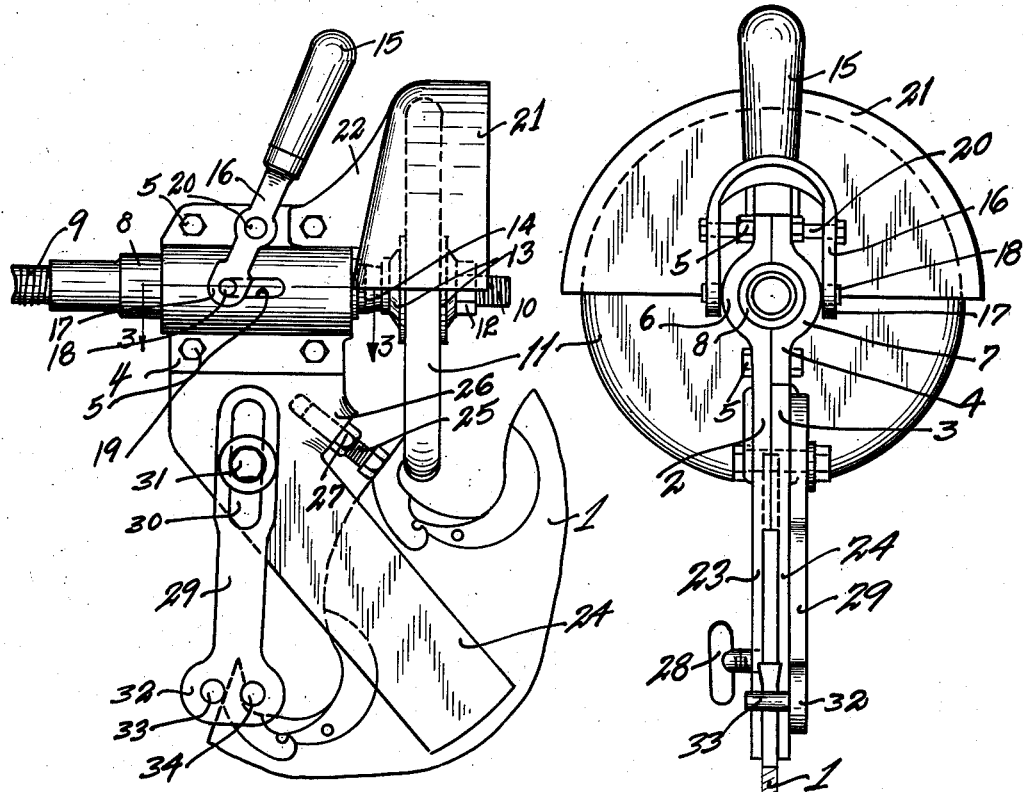
Fig.1
Fig.2
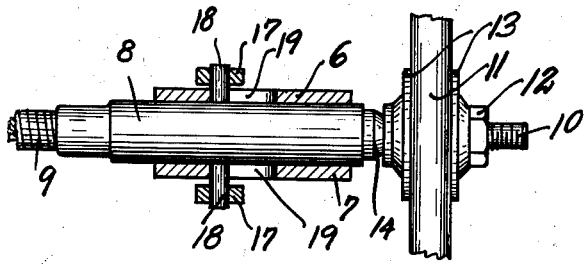
Fig.3
INVENTOR.
Charlie H. Perkins
BY
Glenn L. Fish
ATTORNEYS.

Patented Apr. 13, 1937

2,076,916

UNITED STATES PATENT OFFICE 2,076,916

SAW SHARPENER

Charlie H. Perkins, Duthie, Idaho

Application March 10, 1936, Serial No. 68,049

6 Claims. (Cl. 76—41)

This invention relates to a saw sharpener and more particularly to a sharpener by means of which a circular saw may be sharpened without removal from the arbor or working position and one object of the invention is to provide a sharpener of such construction that it may be applied to the saw blade and the teeth individually sharpened by a rotary grinding wheel.

Another object of the invention is to so construct the sharpener that when it is applied to the saw blade it may securely grip the blade between teeth thereof and may be so adjusted that the tooth operated upon will be ground at the correct angle.

A further object of the invention is to provide the sharpener with bracing means adapted to engage a tooth under the tooth being sharpened and hold the sharpener in the correct position.

A still further object of the invention is to so mount the shaft carrying the grinding stone that the shaft may be shifted longitudinally and the stone moved into and out of grinding engagement with the tooth.

Another object of the invention is to provide a sharpener which is simple in construction, easy to apply and adjust and very easy to operate.

The invention is illustrated in the accompanying drawing, wherein:

Figure 1 is a side elevation of the improved sharpener.

Figure 2 is a view looking at the outer end of the sharpener.

Figure 3 is a fragmentary sectional view taken along the line 3—3 of Figure 1.

This improved sharpener is used for sharpening the teeth of a circular saw 1 and has a frame formed of companion members 2, 3 and 4, the members 2 and 4 being detachably secured to each other by bolts 5 and having opposed outwardly curved portions 6 and 7 constituting walls of a bearing through which extends a bushing 8 serving as a mounting for the terminal of a flexible shaft 9. The terminal of the shaft is provided at its front end with a threaded stem 10 upon which a grinding stone 11 is mounted and secured by a nut 12. Collars 13 are provided at opposite sides of the grinding wheel and the inner collar bears against a thrust bearing 14 formed at the front end of the bushing 8 to prevent frictional binding during rotation of the grinding wheel or stone.

The grinding stone is to be shifted longitudinally of the bearing into and out of position to act upon a tooth of the saw blade, and, in order to do so, there has been provided a handle 15 carrying a fork 16, the arms of which straddle the bearing and terminate in eyes 17 to receive the pins 18 which project from opposite sides of the bushing 8 through slots 19 formed in the walls of the bearing longitudinally thereof. The fork is pivotally mounted by a pin 20 carried by the two members 2 and 4 above the bearing and, when the handle and fork are rocked, the bushing will be shifted longitudinally through the bearing and the grinding wheel moved into or out of grinding engagement with a saw tooth. A shield 21 for the grinding wheel is mounted about the upper portion thereof and formed with an attaching fin or bracket 22 through which one of the bolts 5 passes to securely but detachably hold the shield in place.

The member 3 fits against the member 2 with its upper edge face bearing against the lower edge face of the member 4 and lower portions of the two members 2 and 3 are reduced in thickness from their inner faces to provide arms or forks 23 and 24 which extend diagonally, as shown in Figure 1, and are spaced from each other a distance sufficient to permit the saw blade to fit between the arms. The extent to which the arms or forks can overlap the saw blade is controlled by an abutment screw 25 which is screwed into a threaded socket formed in the shoulder 26 of the frame and carries a locking nut 27 so that when the screw has been properly set the nut may be tightened and hold the frame in its proper position. Therefore, the grinding wheel will have proper engagement with the tooth of the saw and the tooth ground at the correct angle. A thumb screw 28 carried by the leg 23 will, when tightened, cause the blade to be gripped and the frame firmly held in connection with the saw blade.

The frame must be braced against tilting downwardly out of its proper position, and, in order to do so, there has been provided a brace or prop 29 which extends vertically with its upper portion disposed against the outer side face of the member 3 and formed with a longitudinally extending slot 30 through which extends a bolt 31 which serves not only to adjustably mount the prop but also as a fastener for securing the member 3 against the member 2. The prop projects downwardly below the legs 23 and 24 and at its lower end is widened to form a foot 32. Pins 33 and 34 which are spaced from each other a sufficient distance to permit the pin 33 to rest against the sloping outer edge face of a tooth below the one to be sharpened and the pin 34 engages through the notch formed in the inner edge face of the tooth. By this arrangement the sharpener may be applied to a saw blade and the abutment screw may be properly adjusted and secured in such position that when the grinding wheel or stone is shifted towards the tooth against which the abutment screw bears, this tooth will be ground at a desired angle. The grinding wheel can then be shifted away from the sharpened tooth and the thumb screw 28 loosened so that the sharpener may be removed and shifted to the next tooth and secured by again tightening the thumb screw. As the abutment screw and prop remain in their set positions, the sharpener will be in the same angular position it occupied while sharpening the first tooth and the tooth now sharpened will be ground at the same angle as the first tooth. Therefore, all teeth of the saw will be ground at the same angle and the saw correctly sharpened. The power for rotating the flexible shaft and grinding wheel or stone does not have to be shut off while transferring the sharpener from one tooth to another. When the handle 15 is rocked into a backward position it gives the grinding wheel plenty of clearance for making the transfer without interfering with the saw tooth previously ground.

Having thus described the invention, what is claimed is:

1. In a saw sharpener, a frame comprising a main member, upper and lower auxiliary members at one side of the main member, the upper auxiliary member and the upper portion of the main member having opposed portions cooperating to form a bearing and having longitudinally extending slots, a bushing in said bearing provided with side pins projecting through the slots, a handle having forks pivotally mounted above the bearing and disposed in straddling relation to the bearing with their lower ends engaging the pins to shift the bushing longitudinally when the handle and its forks are rocked longitudinally of the bearing, a shaft rotatably mounted through said bushing, a grinder carried by said shaft and shiftable therewith into and out of position for grinding engagement with a saw tooth, means to secure the lower auxiliary member and the lower portion of the main member in straddling engagement with a saw blade, and adjustable means for engaging the saw and holding the frame in angularly adjusted relation to the saw whereby the teeth may be ground at a predetermined angle.

2. In a saw sharpener, a frame comprising a main member, upper and lower auxiliary members at one side of said main member, a bushing slidably mounted between the upper auxiliary member and the upper portion of the main member, a shaft rotatably mounted through said bushing, a grinder carried by said shaft, means for shifting the bushing longitudinally to move said grinder into and out of grinding engagement with a tooth to be sharpened, the lower member and the lower portion of the main member defining arms to straddle a saw blade, a fastener carried by one arm to grip a saw blade and hold the frame in place upon the blade, an abutment screw adjustably mounted in position to engage the tooth to be sharpened, a fastener passing through the main member and upper portion of the lower auxiliary member, a prop extending vertically and having its upper portion formed with a slot receiving the fastener, and abutments carried by the lower portion of said prop to engage another tooth.

3. In a saw sharpener, a frame having its lower portion provided with forks adapted to straddle a saw blade, means for releasably securing the frame upon the blade, a grinder, means carried by the upper portion of said frame for mounting said grinder for movement into and out of position for grinding contact with a tooth to be sharpened, an abutment adjustably carried by said frame above the forks thereof in position for engaging the outer edge face of the tooth to be sharpened, and a prop for engaging another tooth of the saw carried by the frame in depending relation thereto and being angularly and longitudinally adjustable relative to the frame, said prop and the abutment constituting means for controlling angular rotation of the grinder to the tooth to be sharpened.

4. In a saw sharpener, a frame adapted to straddle a saw blade with a portion projecting from the blade, the projecting portion of said frame providing a bearing, a grinder rotatably mounted in said bearing and slidable therethrough into and out of grinding engagement with a tooth to be sharpened, means for detachably securing the frame in straddling engagement with the blade, an abutment carried by said frame for engaging the tooth to be sharpened, a prop for engaging another tooth of the blade, and means for pivotally and slidably connecting said prop with said frame whereby the prop may be angularly and longitudinally adjusted relative to the frame and secured in an adjusted position, said prop and the abutment constituting means for supporting the frame and grinder in predetermined angular relation to the tooth to be sharpened.

5. In a saw sharpener, a frame adapted to be detachably secured to a saw blade, a bearing carried by said frame, a grinder carried by said bearing and shiftable therethrough into and out of grinding contact with a tooth to be sharpened, an adjustable abutment carried by said frame for engaging the tooth to be sharpened, a prop disposed vertically in depending relation to the frame, means for slidably and pivotally connecting said prop with said frame whereby said prop may be moved into predetermined angular relation to the frame and secured in the adjusted position, and pins carried by the lower end of said prop for engaging inner and outer edge faces of a tooth adjoining the tooth to be sharpened and holding the prop in engagement with the tooth engaged by the pins, said prop and said abutment constituting means for holding the frame and the grinder in predetermined angular relation to the tooth to be sharpened.

6. In a saw sharpener, a frame comprising a main member, upper and lower auxiliary members at one side of said main member, a bearing defined by cooperating portions of the upper auxiliary member and the upper portion of the main member, a grinder rotatably and slidably supported in said bearing, means for shifting said grinder into and out of grinding engagement with a tooth to be sharpened, the lower auxiliary member and the lower portion of the main member defining arms to straddle a saw blade, a fastener carried by one arm to grip a saw blade and hold the frame in place upon the blade, an abutment screw adjustably mounted in position to engage the tooth to be sharpened, a fastener passing through the main member and upper portion of the lower auxiliary member, a prop extending vertically and having its upper portion formed with a slot receiving the fastener, and abutments carried by the lower portion of said prop to engage another tooth, the prop and the abutment screw constituting means for maintaining the frame and the grinder in predetermined angular relation to the tooth to be sharpened.

CHARLIE H. PERKINS.